United States Patent
Zhang et al.

(10) Patent No.: US 11,838,831 B2
(45) Date of Patent: Dec. 5, 2023

(54) METHOD AND NETWORK EXPOSURE FUNCTION ENTITY FOR FACILITATING PROVISION OF LOCATION SERVICE

(71) Applicant: Telefonaktiebolaget LM Ericsson (publ), Stockholm (SE)

(72) Inventors: Yun Zhang, Guangzhou (CN); Jingrui Tao, Guangzhou (CN); Fengpei Zhang, Guangzhou (CN)

(73) Assignee: Teleonaktiebolaget LM Ericsson (Publ), Stockholm (SE)

( * ) Notice: Subject to any disclaimer, the term of this patent is extended or adjusted under 35 U.S.C. 154(b) by 414 days.

(21) Appl. No.: 17/284,491

(22) PCT Filed: Jul. 30, 2019

(86) PCT No.: PCT/CN2019/098384
§ 371 (c)(1),
(2) Date: Apr. 12, 2021

(87) PCT Pub. No.: WO2020/078068
PCT Pub. Date: Apr. 23, 2020

(65) Prior Publication Data
US 2021/0345067 A1  Nov. 4, 2021

(30) Foreign Application Priority Data
Oct. 19, 2018 (WO) ................ PCT/CN2018/111008

(51) Int. Cl.
*H04W 8/02* (2009.01)
*H04W 4/029* (2018.01)
(Continued)

(52) U.S. Cl.
CPC ............. *H04W 4/029* (2018.02); *H04W 8/02* (2013.01); *H04W 8/18* (2013.01); *H04W 64/003* (2013.01)

(58) Field of Classification Search
CPC .................................. H04W 4/02; H04W 8/02
See application file for complete search history.

(56) References Cited

U.S. PATENT DOCUMENTS 10,080,098 B1 * 9/2018 Edge ....................... H04L 63/08
2017/0311304 A1 * 10/2017 Lu ....................... H04N 21/4131
(Continued)

OTHER PUBLICATIONS

International Search Report and Written Opinion of the International Searching Authority for PCT International Application No. PCT/CN2019/098384 dated Oct. 30, 2019.
(Continued)

*Primary Examiner* — Michael T Vu
(74) *Attorney, Agent, or Firm* — Christopher & Weisberg, P. A.

(57) ABSTRACT

The present disclosure provides a method in a Network Exposure Function, NEF, entity for facilitating provision of Location Service, LCS. The method includes: receiving from an Application Function, AF, entity a monitoring event subscription message requesting for location reporting of a current location of a terminal device; transmitting a monitoring event configuration request to configure location reporting on an Access and Mobility Management Function, AMF, entity; receiving from the AMF entity a monitoring event indication containing an indication of a cell in which the terminal device is currently located; transmitting to an LCS node a request for the current location of the terminal device; receiving from the LCS node the current location of the terminal device; and transmitting to the AF entity a monitoring event subscription response message containing the current location of the terminal device.

6 Claims, 6 Drawing Sheets

(51) Int. Cl.
*H04W 8/18* (2009.01)
*H04W 64/00* (2009.01)

(56) References Cited

U.S. PATENT DOCUMENTS

2018/0263013 A1    9/2018  Jain et al.
2020/0112907 A1*   4/2020  Dao .................. H04M 15/8016

OTHER PUBLICATIONS

Qualcomm Incorporated, "Unified Solution for Location Service Exposure," SA WG2 Meeting #128bis, S2-188083, Aug. 20-24, 2018, Sophia Antipolis, France, 8 pages.
Qualcomm Incorporated, "Unified Solution for Location Service Exposure," SA WG2 Meeting #128bis, S2-188644, Aug. 20-24, 2018, Sophia Antipolis, France, 8 pages.
Ericsson, "Solution for Location Service exposure," SA WG2 Meeting #127, S2-183960 (revision of S2-183225) Apr. 16-20, 2018, Sanya, P. R. China, 9 pages.
3GPP TS 23.682 V15.4.0, "3rd Generation Partnership Project; Technical Specification Group Services and System Aspects; Architecture enhancements to facilitate communications with packet data networks and applications (Release 15)," Technical Specification, Mar. 2018, 124 pages.
3GPP TS 29.122 V1.2.0, "3rd Generation Partnership Project; Technical Specification Group Core Network and Terminals; T8 reference point for Northbound APIs (Release 15)," Technical Specification, Jun. 2018, 246 pages.
3GPP TS 23.271 V14.4.0, "3rd Generation Partnership Project; Technical Specification Group Services and System Aspects; Functional stage 2 description of Location Services (LCS) (Release 14)," Technical Specification, Mar. 2018, 183 pages.
Open Mobile Alliance (OMA), "Mobile Location Protocol 3.3," OMA-TS-MLP-V3_3-20091001-C, Candidate Version 3.3—Oct. 1, 2009, 134 pages.
EPO Communication with Supplementary European Search Report dated May 11, 2022 for Patent Application No. 19873629.0, consisting of 7-pages.
SA WG2 Meeting #106 Temporary Document S2-144451; Title: MONTE: Monitor Location using GMLC; Agenda Item: 7.9; Source: Ericsson; Work Item/Release: MONTE/Rel-13; Document for: Approval; Date and Location: Nov. 17-21, 2014, San Francisco, USA, consisting of 3-pages.

* cited by examiner

US 11,838,831 B2

METHOD AND NETWORK EXPOSURE FUNCTION ENTITY FOR FACILITATING PROVISION OF LOCATION SERVICE

CROSS REFERENCE TO RELATED APPLICATIONS

This application is a 35 U.S.C. § 371 national stage application of PCT International Application No. PCT/CN2019/098384 filed on Jul. 30, 2019, which itself is a continuation of PCT International Application No. PCT/CN2018/111008, filed Oct. 19, 2018, the disclosures and contents of which are incorporated by reference herein in their entireties.

TECHNICAL FIELD

The present disclosure relates to communication technology, and more particularly, to a method and a Network Exposure Function (NEF) entity for facilitating provision of Location Service (LCS).

BACKGROUND

The Network Exposure Function (NEF) in the $5^{th}$ Generation (5G) communication protocol, or its equivalent functional entity in Long Term Evolution (LTE), Service Capability Exposure Function (SCEF), is a key functional entity in the $3^{rd}$ Generation Partnership Project (3GPP) architecture for service capability exposure that securely exposes services and capabilities provided by 3GPP network interfaces through Application Programming Interfaces (APIs) to Application Functions (AFs), or their LTE equivalents, Service Capability Servers/Application Servers (SCSs/ASs).

3GPP Technical Specification (TS) 23.682, V15.5.0, 2018 June, which is incorporated herein by reference in its entirety, defines how the SCEF can use Mobility Management Entity (MME)/Home Subscriber Server (HSS) or Policy and Charging Rules Function (PCRF)'s monitoring event function (referring to Chapter 5.6.1, *Monitoring Event*). FIG. 1 shows a system architecture relevant to the monitoring event function. As shown, the SCS/AS (or its 5G equivalent, AF) communicates with the SCEF (or its 5G equivalent, NEF) via a T8 interface. The SCEF communicates with the MME (or its 5G equivalent, Access and Mobility Management Function (AMF)) via a T6a interface, the HSS (or its 5G equivalent, User Data Management (UDM) entity) via an S6t interface and the PCRF (or its 5G equivalent, Policy and Charging Function (PCF)) via an Rx interface. The HSS communicates with the MME via an S6a interface. The monitoring event function allows an SCS/AS to request either the current location or last known location of a terminal device (or User Equipment (UE)). In particular, the SCS/AS can send a Monitoring Request message to the SCEF, with Monitoring Type set to "Location Reporting" and Location Type set to "Current Location" or "Last Known Location".

The SCS/AS may also set Accuracy in the Monitoring Request, indicating the desired granularity of accuracy of the requested location information. The supported Accuracy could be at cell level (Cell Global Identification (CGI)/E-UTRAN CGI (ECGI)), evolved NodeB (eNodeB) level, or Tracking Area/Routing Area (TA/RA) level. Only one-time reporting is supported for the last known location, while both one-time location reporting and continuous location reporting are supported for the current location. For continuous location reporting, typically the serving node (e.g., MME) sends a notification every time it becomes aware of a location change of the UE, e.g., when the UE moves from one cell to another.

Currently, the highest accuracy, or the finest granularity, supported by the above location reporting is at the cell level, which means hundreds or thousands of meters depending on different radio deployments. Location Service (LCS), defined in 3GPP TS 22.071, V15.0.0, 2018 June and TS 23.271, V14.4.0, 2018 June, each incorporated herein by reference in its entirety, can provide more accurate location information, e.g., in the order of 50 to 100 meters, by utilizing positioning methods including:

Enhanced Cell Based Positioning,
Adaptive Enhanced Cell ID (AECID) Fingerprinting,
Observed Time Difference Of Arrival (OTDOA), and
Assisted Global Navigation Satellite System (A-GNSS).

In Massive Machine Type Communication (mMTC) scenarios, a UE in Cellular Internet of Things (CIoT) or Low Power Wide Area Network (LPWAN) may operate in accordance with extended Discontinuous Reception (eDRX) or Power Saving Mode (PSM). In this case, when the UE is in the sleep mode, it is not reachable and its location cannot be obtained via LCS. In the CIoT scenario, one of the most popular use cases of LCS is "lock location", which means that once a terminal device is installed, an SCS/AS may want to track if the terminal device has moved. Examples of such terminal device may include anything that is supposed to be relatively stationary, such as a smart meter, a street light or an electric appliance. In order to do so, the SCS/AS can set a geographical fence (or geo-fence) and desire to be notified when the terminal device moves out of the geo-fence. However, the challenge is to obtain the current location of the terminal device that might be in the sleep mode.

3GPP TS 23.271, V14.4.0, 2018 March defines a Deferred Location feature to support LCS for CIoT UEs (referring to Chapter 9.1.15, *EPC Mobile Terminating Location Request*). FIG. 2 a system architecture for the Deferred Location feature. As shown, the SCS/AS (or AF) communicates with a Gateway Mobile Location Center (GMLC), which is a LCS node for external system integration, via an Open Mobile Alliance (OMA) mobile location protocol, mlp, interface, and the GMLC communicates with the MME (AMF) via an SLg interface. The SCS/AS can send a Mobile Terminated Location Request (MT-LR) to the GMLC (referring to Chapter 9.1.8, *Mobile Terminating Deferred Location Request—UE available event*), requesting for location information of a UE. The UE may be in the sleep mode at this time. In this case, the GMLC can interact with the MME and request a deferred location of the UE based on delayed location reporting at the MME. In this way, there is no need to notify the SCS/AS when the UE becomes reachable and require the SCS/AS to then issue another MT-LR before the UE becomes unreachable again.

SUMMARY

It is an object of the present disclosure to provide a method and an NEF entity for facilitating provision of LCS, capable of providing more accurate location information based on the monitoring event function.

According to a first aspect of the present disclosure, a method in an NEF entity for facilitating provision of LCS is provided. The method includes: receiving from an AF entity a monitoring event subscription message requesting for location reporting of a current location of a terminal device;

transmitting a monitoring event configuration request to configure location reporting on an AMF entity; receiving from the AMF entity a monitoring event indication containing an indication of a cell in which the terminal device is currently located; transmitting to an LCS node a request for the current location of the terminal device; receiving from the LCS node the current location of the terminal device; and transmitting to the AF entity a monitoring event subscription response message containing the current location of the terminal device.

In an embodiment, the monitoring event subscription message may indicate a location accuracy higher than a cell level.

In an embodiment, the request for the current location of the terminal device can be transmitted to the LCS node and the current location of the terminal device can be received from the LCS node via an mlp interface.

In an embodiment, the LCS node can be a GMLC.

According to a second aspect of the present disclosure, a method in an NEF entity for facilitating provision of LCS is provided. The method includes: receiving from an AF entity a monitoring event subscription message requesting for location reporting of a current location of a terminal device; transmitting to an LCS node a request for a last known location of the terminal device; receiving from the LCS node the last known location of the terminal device; transmitting to the LCS node a request for setting a geographical fence for the terminal device based on the last known location; receiving from the LCS node a location report indicating the current location of the terminal device when the terminal device moves out of the geographical fence; and transmitting to the AF entity a monitoring event subscription response message containing the current location of the terminal device.

In an embodiment, the monitoring event subscription message may indicate a location accuracy higher than a cell level.

In an embodiment, the request for the last known location of the terminal device and the request for setting the geographical fence can be transmitted to the LCS node and the last known location of the terminal device and the location report can be received from the LCS node via an mlp interface.

In an embodiment, the LCS node can be a GMLC.

According to a third aspect of the present disclosure, an NEF entity is provided. The NEF includes a processor and a memory. The memory contains instructions executable by the processor whereby the NEF entity is operative to perform the method according to the above first or second aspect.

According to a fourth aspect of the present disclosure, a computer readable storage medium is provided. The computer readable storage medium has computer program instructions stored thereon. The computer program instructions, when executed by a processor in an NEF entity, cause the NEF entity to perform the method according to the above first or second aspect.

With the embodiments of the present disclosure, the NEF can integrate with LCS functions, e.g., GMLC, and provide more accurate location information based on the monitoring event function, especially for terminal devices (e.g., CIoT UEs) operating in accordance with eDRX or PSM.

BRIEF DESCRIPTION OF THE DRAWINGS

The above and other objects, features and advantages will be more apparent from the following description of embodiments with reference to the figures, in which.

DETAILED DESCRIPTION

Figure 1:
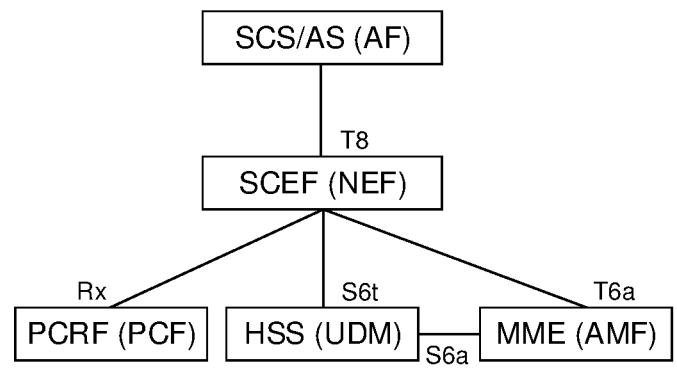
FIG. 1 is a schematic diagram showing a system architecture relevant to the monitoring event function.
Figure 2:
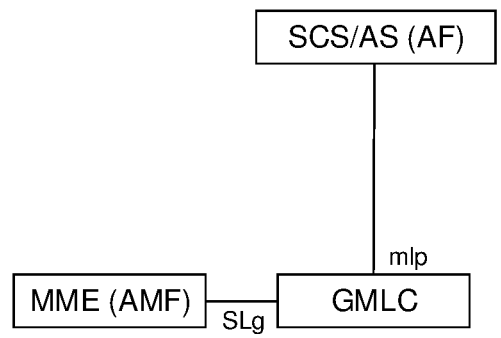
FIG. 2 is a schematic diagram showing a system architecture for the Deferred Location feature.

As used herein, the term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), desktop computers, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment.

The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

In the following, references in the specification to "one embodiment", "an embodiment", "an example embodiment" and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Unless indicated otherwise, all features described in connection with 5G network nodes or functional entities also apply to their LTE equivalents, or vice versa.

Figure 3:
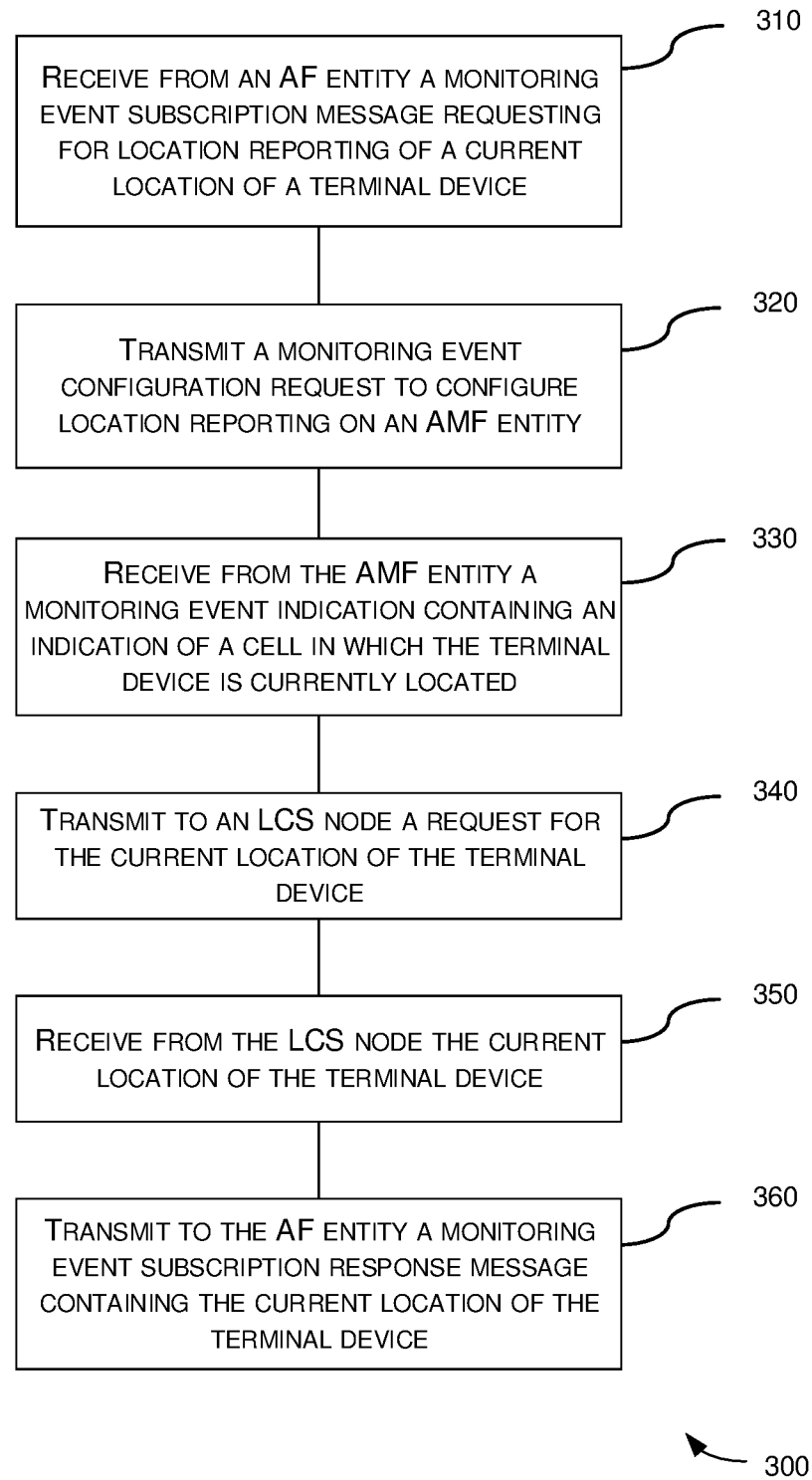
FIG. 3 is a flowchart illustrating a method for facilitating provision of LCS according to an embodiment of the present disclosure.

FIG. 3 is a flowchart illustrating a method 300 for facilitating provision of LCS according to an embodiment of the present disclosure. The method 300 can be performed at an NEF, or SCEF, entity.

At block 310, a monitoring event subscription message is received from an AF entity (or SCS/AS), requesting for location reporting of a current location of a terminal device. In an example, the monitoring event subscription message may indicate a location accuracy higher than a cell level, or a location granularity finer than a cell level.

At block 320, a monitoring event configuration request is transmitted to configure location reporting on an AMF entity (or MME).

At block 330, a monitoring event indication is received from the AMF entity. The monitoring event indication contains an indication of a cell in which the terminal device is currently located.

At block 340, a request for the current location of the terminal device is transmitted to an LCS node.

At block 350, the current location of the terminal device is received from the LCS node.

In an example, the LCS node can be a GMLC. The request for the current location of the terminal device can be transmitted in the block 340 to the LCS node and the current location of the terminal device can be received in the block 350 from the LCS node via an mlp interface.

At block 360, a monitoring event subscription response message containing the current location of the terminal device is transmitted to the AF entity.

Figure 4:
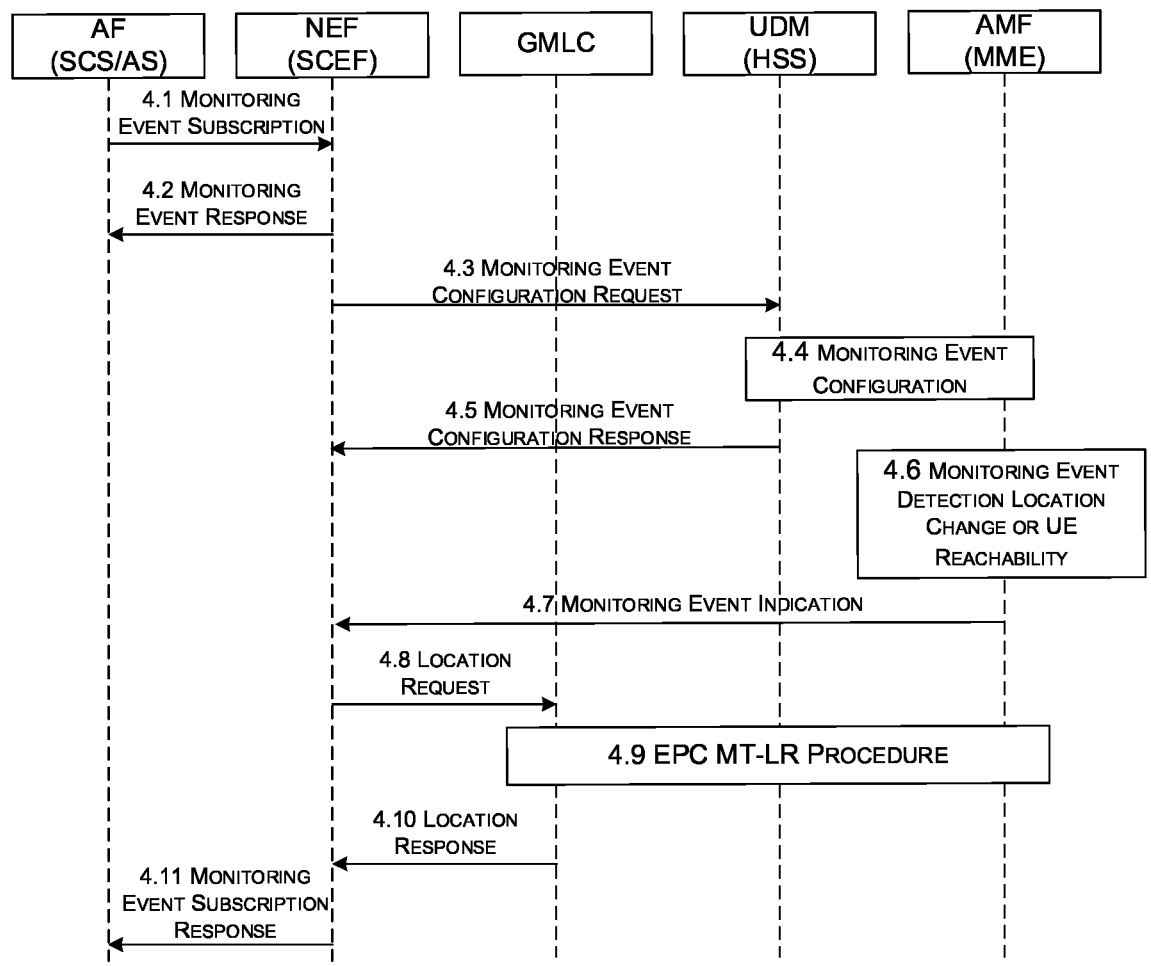
FIG. 4 is a sequence chart explaining the method shown in FIG. 3.

FIG. 4 is a sequence chart explaining the above method 300.

At 4.1, the AF entity (or SCS/AS) sends a monitoring event subscription message to the NEF (or SCEF) entity via T8 interface, requesting for location reporting of a current location of a UE, with Monitoring Type set to "Location Reporting", Location Type set to "Current Location" and Accuracy set to e.g., "LCS_GMLC" to indicate integration with GMLC to obtain location information more accurate than the cell level. This can be based on T8 API MonitoringEventSubscription in 3GPP TS29.122. At 4.2, the NEF entity sends a monitoring event response message to the AF entity, acknowledging the reception of the monitoring event subscription message. At 4.3, the NEF entity sends a monitoring event configuration request to the UDM entity (or HSS) via S6t interface, with Event Type set to "Location_Reporting" or "UE_Reachability", triggering monitoring event configuration on the UDM entity and the AMF entity (or MME) at 4.4 (referring to 3GPP TS 23.682, Chapter 5.6.1). At 4.5, the UDM entity sends a monitoring event configuration response to the NEF entity via S6t interface. At 4.6, the AMF detects location change of the UE (referring to 3GPP TS 23.682, Chapter 5.6.1) or reachability of the UE e.g., when the UE transitions from the sleep mode to the connected mode, and sends a monitoring event indication to the NEF entity via T6a interface at 4.7, containing an indication of a cell in which the UE is currently located (which implies that the UE is currently reachable). At 4.8, the NEF entity sends a request for the current location of the UE to the GMLC via mlp interface (e.g., Standard Location Immediate Service request, Loc_type: Current Location). At 4.9, the GMLC initiates an MT-LR procedure (referring to 3GPP TS 23.271, Chapter 9.1.5) to obtain the current location of the UE. At 4.10, the GMLC responds to the NEF entity with the current location of the UE via mlp interface (e.g., Standard Location Immediate Service answer). At 4.11, the NEF entity sends a monitoring event subscription response message containing the current location of the UE to the AF entity via T8 interface.

With the above process, the NEF entity requests the current location of the UE from the GMLC when it learns from the AMF entity that the UE is currently reachable. Accordingly, the GMLC will initiate the location request procedure to obtain the current location of the UE only when the UE is reachable. There is no need for the GMLC to subscribe to notification of the UE reachability with the AMF entity.

In a sense the above method 300 can be considered as a "lock location" application in which a geo-fence is set to a cell. Alternatively, the geo-fence can be set differently as desired by the AF entity. Typically, a complicated geo-fence (e.g. polygon) would not be required and a simple circle would good enough for most of the cases.

Figure 5:
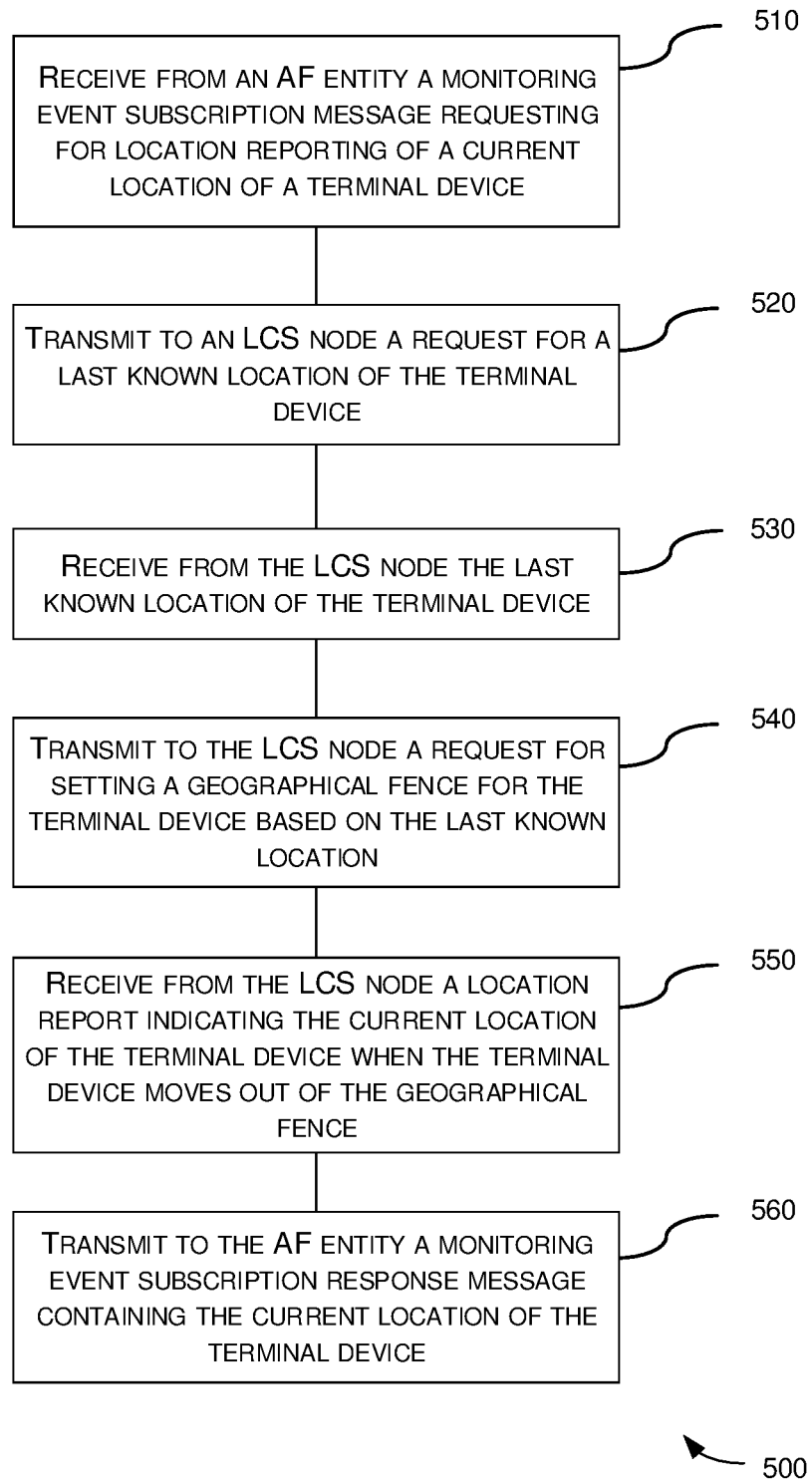
FIG. 5 is a flowchart illustrating a method for facilitating provision of LCS according to another embodiment of the present disclosure.

FIG. 5 is a flowchart illustrating a method 500 for facilitating provision of LCS according to an embodiment of the present disclosure. The method 300 can be performed at an NEF, or SCEF, entity.

At block 510, a monitoring event subscription message is received from an AF entity (or SCS/AS), requesting for location reporting of a current location of a terminal device. In an example, the monitoring event subscription message may indicate a location accuracy higher than a cell level, or a location granularity finer than a cell level.

At block 520, a request for a last known location of the terminal device is transmitted to an LCS node.

At block 530, the last known location of the terminal device is received from the LCS node.

At block 540, a request for setting a geographical fence for the terminal device based on the last known location is transmitted to the LCS node.

At block 550, a location report is received from the LCS node, indicating the current location of the terminal device when the terminal device moves out of the geographical fence.

At block 560, a monitoring event subscription response message containing the current location of the terminal device is transmitted to the AF entity.

In an example, the LCS node can be a GMLC. The request for the last known location of the terminal device and the request for setting the geographical fence can be transmitted to the LCS node and the last known location of the terminal device and the location report can be received from the LCS node via an mlp interface.

Figure 6:
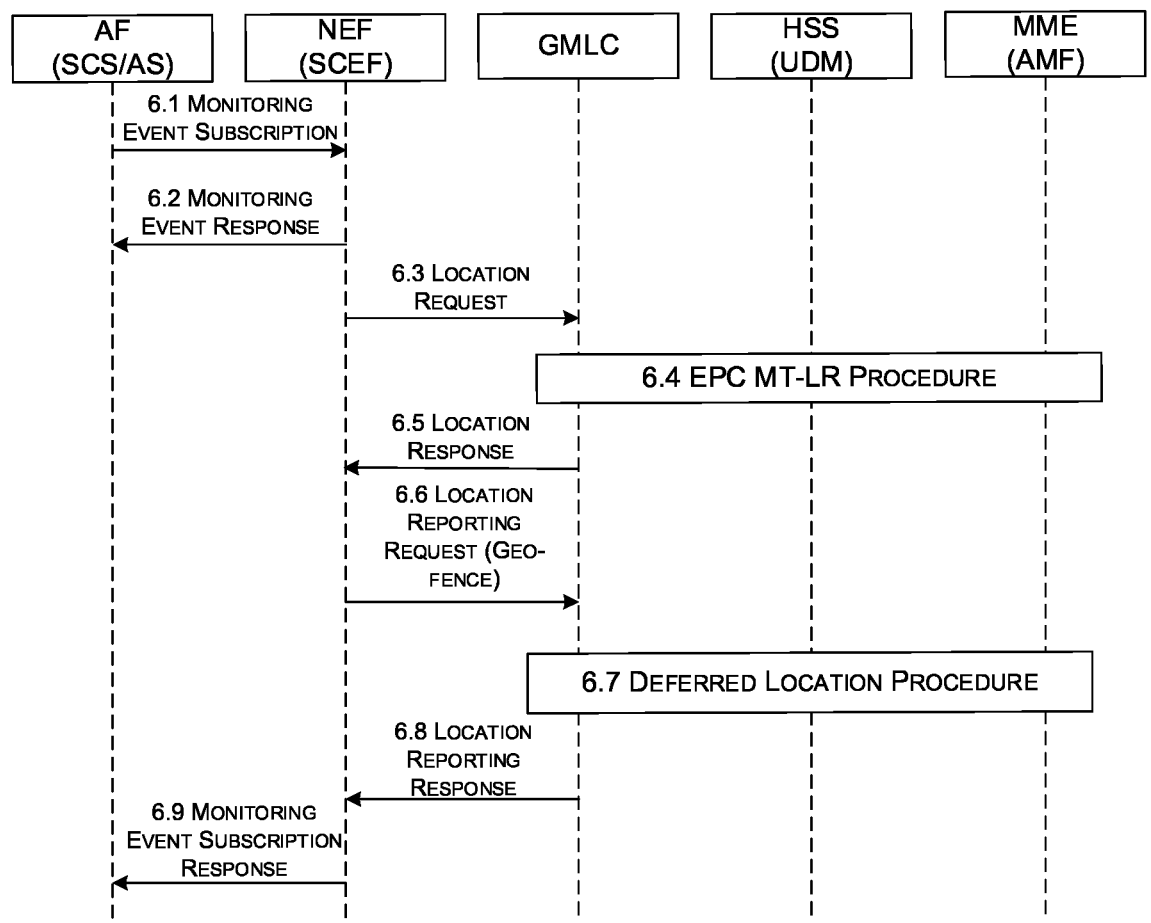
FIG. 6 is a sequence chart explaining the method shown in FIG. 5.

FIG. 6 is a sequence chart explaining the above method 500.

At 6.1, the AF entity (or SCS/AS) sends a monitoring event subscription message to the NEF (or SCEF) entity via T8 interface, requesting for location reporting of a current location of a UE, with Monitoring Type set to "Location_Reporting", Location Type set to "Current Location" and Accuracy set to e.g., "LCS_GMLC" to indicate integration with GMLC to obtain location information more accurate than the cell level. This can be based on T8 API MonitoringEventSubscription in 3GPP TS29.122. At 6.2, the NEF entity sends a monitoring event response message to the AF entity, acknowledging the reception of the monitoring event subscription message. At 6.3, the NEF entity sends a request for a last known location of the UE to the GMLC via mlp interface (e.g., Standard Location Immediate Service request, Loc_type: Last Known Location). At 6.4, the GMLC initiates an MT-LR procedure (referring to 3GPP TS 23.271, Chapter 9.1.5) to obtain the last known location of the UE. At 6.5, the GMLC responds to the NEF entity with the last known location of the UE via mlp interface (e.g., Standard Location Immediate Service answer). At 6.6, the NEF entity sends a location reporting request to the GMLC via mlp interface to set a circle geo-fence for lock location, centered at the last known location and having a predetermined radius of e.g., 100 meters. At 6.7, the GMLC initiates a Deferred Location procedure for change of area event (referring to 3GPP TS 23.271, Chapter 9.1.19). At 6.8, when the UE moves out of the geographical fence, the GMLC sends a location reporting response to the NEF entity via mlp interface, indicating the current location of the UE. At 6.9, the NEF entity sends a monitoring event subscription response message containing the current location of the UE to the AF entity via T8 interface.

In another example, in the monitoring event subscription message, the Location Type can be set to "Last Known Location". In this case, after the NEF entity obtains the last known location of the UE at 6.5, it sends the last known location to the AF entity, e.g., in a monitoring event subscription response message, via T8 interface. Then the process may end. This allows the AF entity to obtain the last known location of the UE that is more accurate than the cell level.

Figure 7:
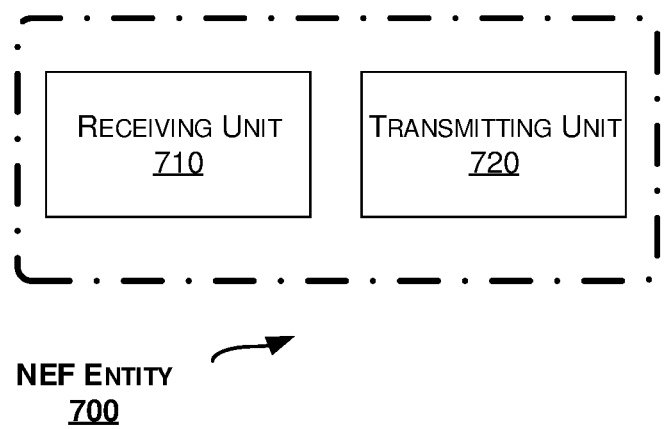
FIG. 7 is a block diagram of an NEF entity according to an embodiment of the present disclosure.

Correspondingly to the method 300 and 500 as described above, an NEF entity is provided. FIG. 7 is a block diagram of an NEF entity 700 according to an embodiment of the present disclosure.

As shown in FIG. 7, the NEF entity 700 includes a receiving unit 710 configured to receiving from an AF entity a monitoring event subscription message requesting for location reporting of a current location of a terminal device. The NEF entity 700 further includes a transmitting unit 720 configured to transmit a monitoring event configuration request to configure location reporting on an AMF entity. The receiving unit 710 is further configured to receive from the AMF entity a monitoring event indication containing an indication of a cell in which the terminal device is currently located. The transmitting unit 720 is further configured to transmit to an LCS node a request for the current location of the terminal device. The receiving unit 710 is further configured to receive from the LCS node the current location of the terminal device. The transmitting unit 720 is further configured to transmit to the AF entity a monitoring event subscription response message containing the current location of the terminal device.

In an embodiment, the monitoring event subscription message may indicate a location accuracy higher than a cell level.

In an embodiment, the request for the current location of the terminal device can be transmitted to the LCS node and the current location of the terminal device can be received from the LCS node via an mlp interface.

In an embodiment, the LCS node can be a GMLC.

Alternatively, the receiving unit 710 is configured to receive from an AF entity a monitoring event subscription message requesting for location reporting of a current location of a terminal device. The transmitting 720 is configured to transmit to an LCS node a request for a last known location of the terminal device. The receiving unit 710 is further configured to receive from the LCS node the last known location of the terminal device. The transmitting unit 720 is further configured to transmit to the LCS node a request for setting a geographical fence for the terminal device based on the last known location. The receiving unit 710 is further configured to receive from the LCS node a location report indicating the current location of the terminal device when the terminal device moves out of the geographical fence. The transmitting unit 720 is further configured to transmit to the AF entity a monitoring event subscription response message containing the current location of the terminal device.

In an embodiment, the monitoring event subscription message may indicate a location accuracy higher than a cell level.

In an embodiment, the request for the last known location of the terminal device and the request for setting the geographical fence can be transmitted to the LCS node and the last known location of the terminal device and the location report can be received from the LCS node via an mlp interface.

In an embodiment, the LCS node can be a GMLC.

The units 710-720 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3 or 5.

Figure 8:
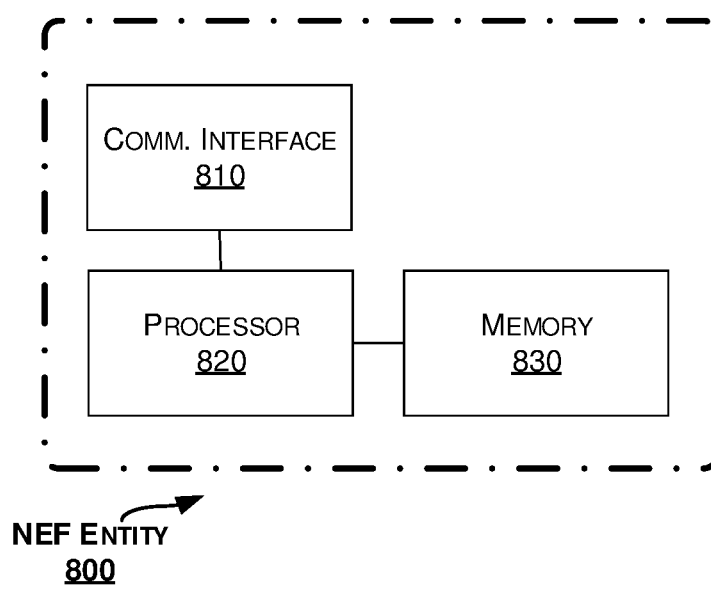
FIG. 8 is a block diagram of an NEF entity according to another embodiment of the present disclosure.

FIG. 8 is a block diagram of an NEF entity 800 according to another embodiment of the present disclosure.

The NEF entity 800 includes a communication interface 810, a processor 820 and a memory 830. The memory 830 contains instructions executable by the processor 820 whereby the NEF entity 800 is operative to perform the actions, e.g., of the procedure described earlier in conjunction with FIG. 3. Particularly, the memory 830 contains instructions executable by the processor 820 whereby the NEF entity 800 is operative to: receive from an AF entity a monitoring event subscription message requesting for location reporting of a current location of a terminal device; transmit a monitoring event configuration request to configure location reporting on an AMF entity; receive from the AMF entity a monitoring event indication containing an indication of a cell in which the terminal device is currently located; transmit to an LCS node a request for the current location of the terminal device; receiving from the LCS node the current location of the terminal device; and transmitting to the AF entity a monitoring event subscription response message containing the current location of the terminal device.

In an embodiment, the monitoring event subscription message may indicate a location accuracy higher than a cell level.

In an embodiment, the request for the current location of the terminal device can be transmitted to the LCS node and the current location of the terminal device can be received from the LCS node via an mlp interface.

In an embodiment, the LCS node can be a GMLC.

Alternatively, the memory 830 contains instructions executable by the processor 820 whereby the NEF entity 800 is operative to perform the actions, e.g., of the procedure described earlier in conjunction with FIG. 5. Particularly, the memory 830 contains instructions executable by the processor 820 whereby the NEF entity 800 is operative to: receive from an AF entity a monitoring event subscription message requesting for location reporting of a current location of a terminal device; transmit to an LCS node a request for a last known location of the terminal device; receive from the LCS node the last known location of the terminal device; transmit to the LCS node a request for setting a geographical fence for the terminal device based on the last known location; receive from the LCS node a location report indicating the current location of the terminal device when the terminal device moves out of the geographical fence; and transmit to the AF entity a monitoring event subscription response message containing the current location of the terminal device.

In an embodiment, the monitoring event subscription message may indicate a location accuracy higher than a cell level.

In an embodiment, the request for the last known location of the terminal device and the request for setting the geographical fence can be transmitted to the LCS node and the last known location of the terminal device and the location report can be received from the LCS node via an mlp interface.

In an embodiment, the LCS node can be a GMLC.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 820 causes the NEF entity 800 to perform the actions, e.g., of the procedure described earlier in conjunction with FIG. 3 or 5.

The computer program product may be configured as a computer program code structured in computer program modules. The computer program modules could essentially perform the actions of the flow illustrated in FIG. 3 or 5.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a Network Exposure Function, NEF, entity for facilitating provision of Location Service, LCS, comprising:
receiving from an Application Function, AF, entity a monitoring event subscription message requesting for location reporting of a current location of a terminal device;
transmitting a monitoring event configuration request to configure location reporting on an Access and Mobility Function, AMF, entity;
receiving from the AMF entity a monitoring event indication containing an indication of a cell in which the terminal device is currently located;
transmitting to an LCS node a request for the current location of the terminal device;
receiving from the LCS node the current location of the terminal device; and
transmitting to the AF entity a monitoring event subscription response message containing the current location of the terminal device.

2. The method of claim 1, wherein the monitoring event subscription message indicates a location accuracy higher than a cell level.

3. The method of claim 1, wherein the request for the current location of the terminal device is transmitted to the LCS node and the current location of the terminal device is received from the LCS node via a mobile location protocol, mlp, interface.

4. The method of claim 1, wherein the LCS node is a Gateway Mobile Location Center, GMLC.

5. A Network Exposure Function, NEF, entity comprising a communication interface, a processor and a memory, the memory comprising instructions executable by the processor whereby the NEF entity is operative to perform the method according to claim 1.

6. A non-transitory computer readable storage medium having computer program instructions stored thereon, the computer program instructions, when executed by a processor in a Network Exposure Function, NEF, entity, causing the NEF entity to:
- receive from an Application Function, AF, entity a monitoring event subscription message requesting for location reporting of a current location of a terminal device;
- transmit a monitoring event configuration request to configure location reporting on an Access and Mobility Function, AMF, entity;
- receive from the AMF entity a monitoring event indication containing an indication of a cell in which the terminal device is currently located;
- transmit to an LCS node a request for the current location of the terminal device; and
- receive from the LCS node the current location of the terminal device; and
- transmit to the AF entity a monitoring event subscription.

\* \* \* \* \*